United States Patent [19]

Fisher, III et al.

[11] Patent Number: 4,605,180

[45] Date of Patent: Aug. 12, 1986

[54] SEAT BELT RETRACTOR ASSEMBLY

[75] Inventors: Alfred J. Fisher, III, Grosse Pointe Farms; Timothy J. Schmidt, Troy, both of Mich.

[73] Assignee: General Safety Corporation, St. Clair Shores, Mich.

[21] Appl. No.: 640,468

[22] Filed: Aug. 13, 1984

[51] Int. Cl.$^4$ .............................................. B60R 22/40
[52] U.S. Cl. ................................................ 242/107.4 A
[58] Field of Search ................. 242/107.4 A, 107.4 R, 242/107.4 B–107.4 E, 107.6, 107.7; 280/806–808; 297/475–478

[56] References Cited

U.S. PATENT DOCUMENTS

| | | | |
|---|---|---|---|
| 3,868,068 | 2/1975 | Heath | 242/107.4 A |
| 4,083,511 | 4/1978 | Ikesue | 242/107.4 A |
| 4,437,623 | 3/1984 | Wyder | 242/107.4 A X |
| 4,453,681 | 6/1984 | Gueguen et al. | 242/107.4 A |
| 4,483,495 | 11/1984 | Honl | 242/107.4 A |

Primary Examiner—John M. Jillions
Attorney, Agent, or Firm—Harness, Dickey & Pierce

[57] ABSTRACT

An improved seat belt retractor of the emergency locking variety is described. The primary improvement resides in providing a spur gear component which is insert molded directly onto one of the toothed sprockets of the retractor spool. By eliminating the two-piece prior art assembly, and molding the spur gear directly onto the toothed sprocket, the spur gear strength characteristics are vastly improved. Moreover, the relative positioning between the teeth of the spur gear and those of the toothed sprocket may be controlled with a very high degree of accuracy. This design further eliminates the required step of assembling the spur gear and sprocket together, and avoids problems of these components becoming separated during assembly or use.

4 Claims, 7 Drawing Figures

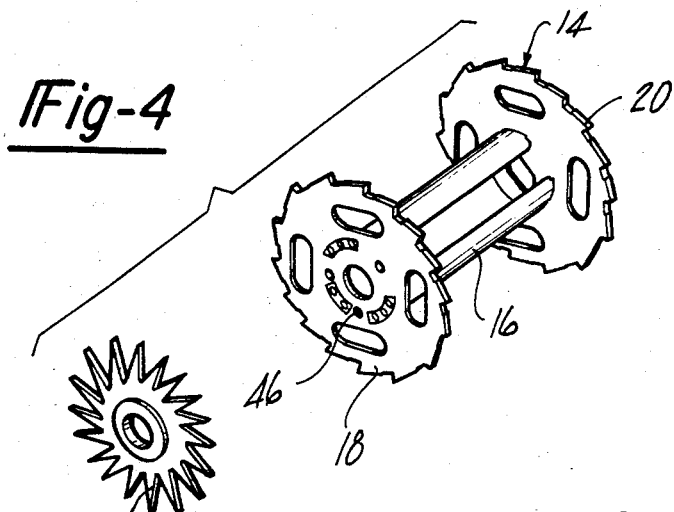
Fig-4
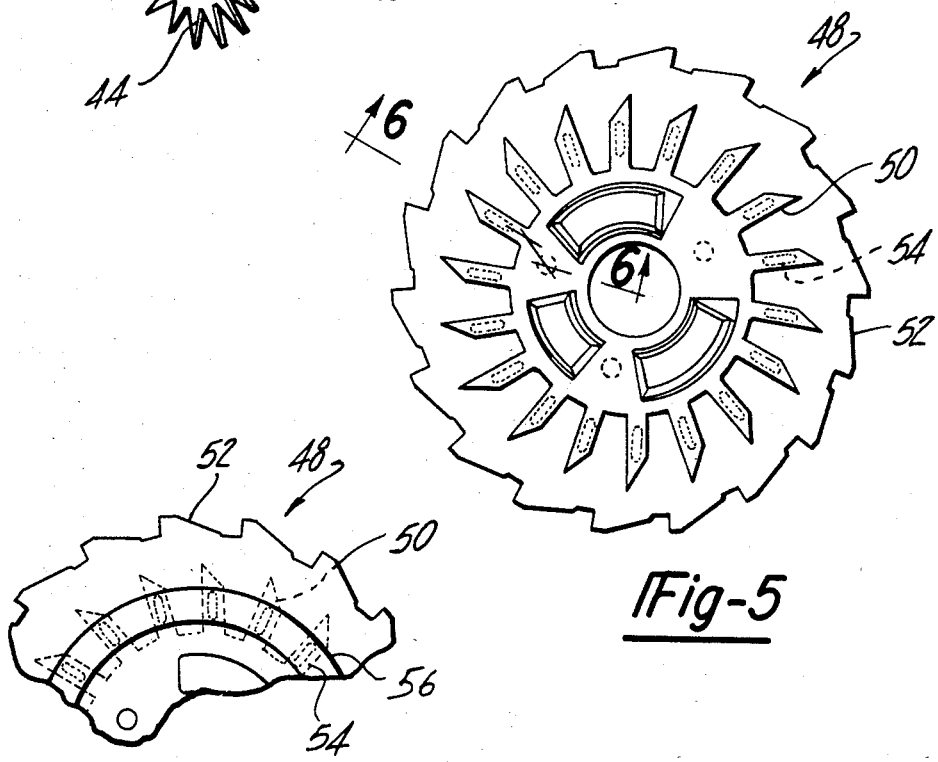
Fig-5
Fig-7
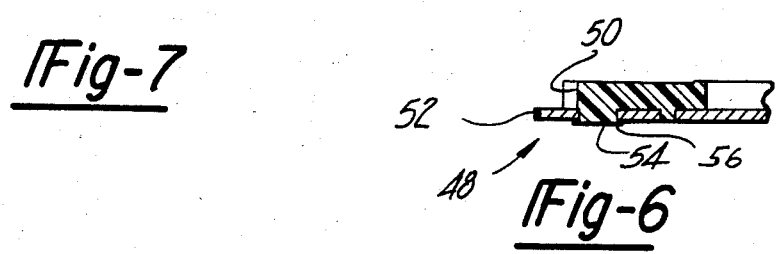
Fig-6

SEAT BELT RETRACTOR ASSEMBLY

BACKGROUND AND SUMMARY OF THE INVENTION

This invention relates to a motor vehicle seat belt retractor and particularly, to such a retractor having an improved inertia sensitive actuator mechanism.

Most motor vehicles are equipped with seat belt systems which act to restrain the occupants when the vehicle is subjected to high rates of deceleration which may occur, for example, during a motor vehicle collision. Many seat belt retractors are of the so-called emergency locking variety. These retractors employ an inertia sensitive actuator which prevents seat belt webbing from being withdrawn from the retractor when the vehicle is subjected to deceleration forces above a predetermined level, thereby restraining the vehicle occupant. During normal operating circumstances, however, the seat belt webbing may be freely withdrawn from the retractor, enabling freedom of movement by the vehicle occupants.

The inertia sensitive actuator mechanism of a conventional emergency locking retractor includes a spur gear which is attached to one of a pair of toothed sprockets. These toothed sprockets are connected to a rotating belt support shaft. The function of the spur gear is to engage a pawl of the inertia sensitive actuator when the vehicle is subjected to high level deceleration. Once engaged, the inertia sensitive actuator causes engagement between a locking lever and the toothed sprocket thereby preventing continued seat belt webbing withdrawal from the retractor assembly. The spur gear must be accurately positioned with respect to the toothed sprocket. Inaccurate positioning between components can lead to a mechanical failure of the spur gear and/or the remaining components of the inertia sensitive actuator. As a means of accurately positioning the teeth of the spur gear relative to the toothed sprockets, it is current practice to include one or more locating tabs on the spur gear which engage bores or indentations formed by the end surface of the toothed sprocket. It is therefore necessary for an operator to carefully position the parts during assembly.

In accordance with this invention, an improved seat belt retractor of the emergency locking variety is described. The principal improvement in the retractor design resides in providing a spur gear component which is molded directly to one of the toothed sprockets of the retractor. By molding these parts together, precise positioning therebetween can be maintained with a high degree of accuracy. Further, the strength of the spur gear is substantially increased due to its integration with the toothed sprocket. In addition to strengthening the spur gear itself, the connection between the spur gear and toothed sprocket becomes much more secure. Finally, due to the vastly increased strength and dimensional control characteristics inherent in the design according to this invention, a broader range of materials may be employed to form the spur gear component as compared with prior art designs.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 4 is an exploded pictorial view of the spool and spur gear components of an emergency locking retractor according to a prior art design;

FIG. 5 is a cross-sectional view taken along line 5—5 of FIG. 1 showing an integral spur gear and toothed sprocket according to this invention;

FIG. 6 is a cross-sectinal view taken along line 6—6 of FIG. 5 particularly showing the interlocking engagement between the spur gear and toothed sprocket according to this invention; and FIG. 7 is a partial cross-sectional view taken from a direction opposite that from which FIG. 5 is taken, thereby showing the reversed surface of the toothed sprocket.

DETAILED DESCRIPTION OF THE DRAWINGS

Figure 1:
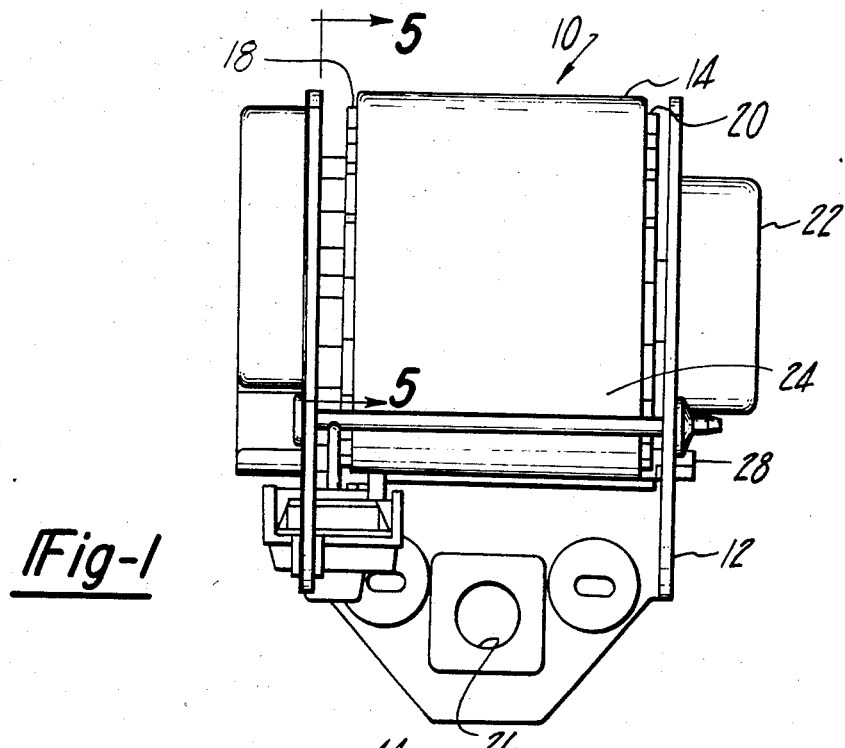
FIG. 1 is a frontal view of a seat belt retractor of the emergency locking variety.

A prior art seat belt retractor is shown assembled in FIG. 1 and is generally designated there by reference character 10. Retractor assembly 10 includes retractor frame 12 to which rotatable spool 14 is mounted. Spool 14 includes a belt support shaft 16 terminating laterally in a pair of radially extending toothed sprockets 18 and 20. Tortion spring assembly 22 acts upon belt support shaft 16 to rotatably bias spool 14 so that a belt webbing retracting force is applied when webbing 24 is withdrawn from retractor 10. One end of seat belt webbing 24 is attached to belt suppport shaft 16 and becomes rolled onto spool 14 as it is rotated. Retractor frame 12 includes one or more mounting holes 26 for fasteners which permit secure attachment of retractor 10 to the associated vehicle. Locking bar 28 is particularly shown by FIGS. 2 and 3, and is movable between a normal non-engaged position to an engaged position wherein the locking bar engages one of the teeth of toothed sprockets 18 and 20. Locking bar 28 is caused to move to an engaged position by inertia sensitive actuator 30 which includes housing 32 attached to frame 12, and internally disposed weighted element 34. Weighted element 34 moves to a tilted position once retractor assembly 10 (and the associated motor vehicle) are exposed to deceleration forces above a predetermined level ( or when retractor frame 12 is tilted from its installed position). Once weighted element 34 is caused to move to a tilted pposition, locking lever 36 becomes raised due to contact between the weighted element and lug 38 of the locking lever. Locking lever 36 rotates about pivot 40 between the normal and engaged positions.

Figure 2:
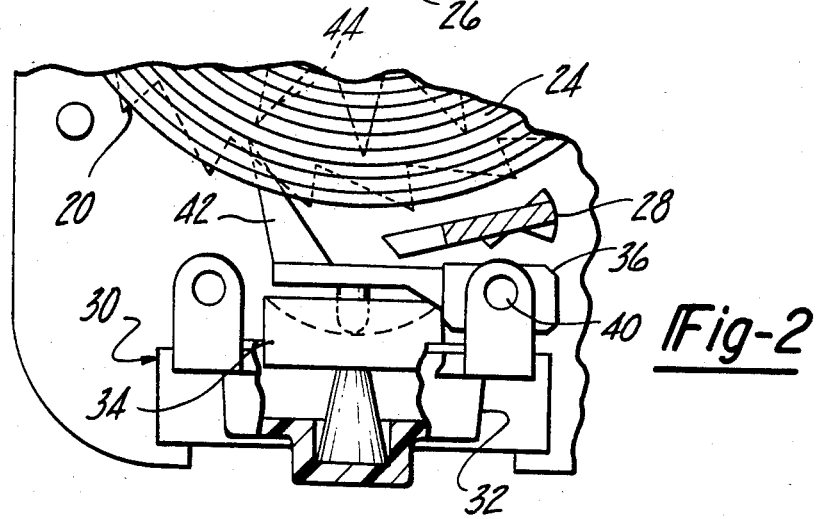
FIG. 2 is a partial side view of the retractor shown by FIG. 1, particularly showing the inertia sensitive actuator of the retractor in a normal, non-engaged position.
Figure 3:
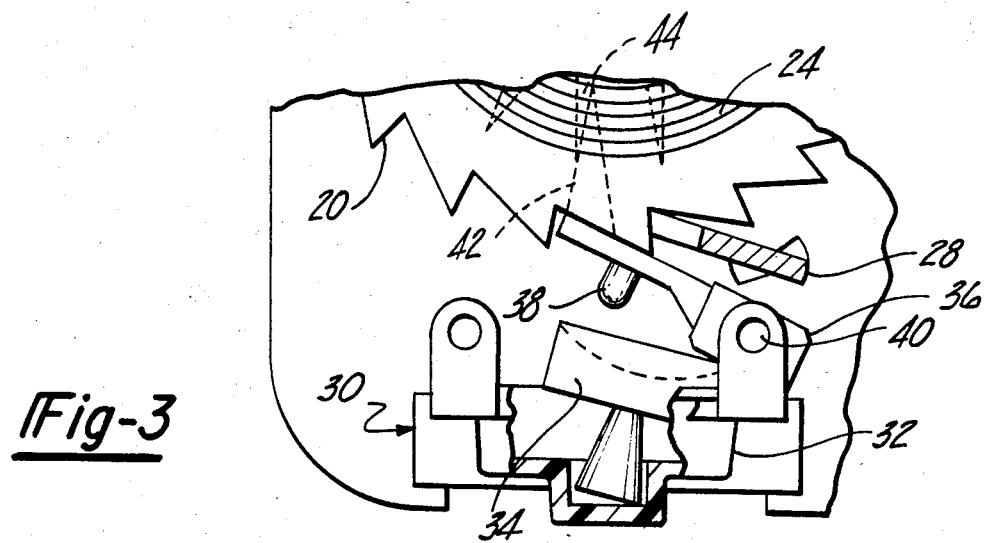
FIG. 3 is a partial side view of the retractor shown by FIG. 1, particularly showing the inertia sensitive actuator of the retractor in an engaged position.

FIG. 2 illustrates the normal position of the components of inertia sensitive actuator 30. When, however, weighted element 34 moves toward a tilted position, locking lever 36 is caused to rotate in a clockwise direction, with respect to the orientations shown by FIGS. 2 and 3. Once slightly rotated, actuator pawl 42 of locking lever 36 engages a tooth of spur gear 44 which is also rotatable with spool 14. Rotation of spool 14 causes continued rotation of locking lever 36 until the locking lever contacts the underside of locking bar 28, urging it into engagement with a tooth of toothed sprockets 18 and 20. Actuator pawl 42 and spur gear 44 are provided to augment the rotational urging forces applied to locking lever 36 as weighted element 34 becomes tilted. Such augmentation results in improved reliability and accuracy of retractor locking and provides positive engagement between locking bar 28 and toothed sprockets 18 and 20.

FIG. 4 illustrates spool 14 and spur gear 44 according to prior art designs. As shown by that Figure, spur gear 44 is a separate component typically made from a polymeric plastic material which is connected to toothed sprocket 18 by engagement between a plurality of protruding bosses (not shown) and holes or depressions 46 within the outer surface of toothed sprocket 18. The bosses and holes 46 are located such that when they are in registry with one another, the teeth of toothed sprocket 18 and those of spur gear 44 are in a predetermined angularly alingned condition. Typically, this alignment is provided by positioning bosses and holes 46 such that the two parts engage only when they are in a desired angular relationship. As is evident from a description of the operation of the inertia sensitive actuator mechanism 30 described above, this precise relationship between the positions of toothed sprocket 18 and spur gear 44 must be maintained. Otherwise, excessive rotation of spur gear 44 would occur prior to engagement between locking bar 28 and toothed sprockets 18 and 20, thereby presenting the potential for mechanical failure of spur gear 44 and/or actuator pawl 42.

In accordance with this invention, an integrated spur gear and toothed sprocket assembly 48 is shown with reference to FIGS. 5, 6 and 7. The spur gear portion 50 of assembly 48 is formed by molding directly onto modified toothed sprocket 52, as shown by cross-sectional view FIG. 6. During molding, the material which makes up spur gear 50 flows into and engages a plurality of bores or slots 54 provided through toothed sprocket 52. Enhanced reinforcement of the teeth of spur gear 50 and firm engagement between the spur gear and toothed sprocket 52 may be provided by forming a continuous ring 56 of material on the reverse side of modified toothed sprocket 52 from the side having spur gear 50. As best shown by FIGS. 6 and 7, ring 56 communicates with each of slots 54.

Integral spur gear and toothed sprocket assembly 48 is preferably formed by first assembling the toothed sprockets onto belt support shaft 16 and then inserting toothed sprocket 52 within an injection molding die cavity. Alternately, assembly 48 could be formed and later attached to belt support shaft 16. Regardless of the assembly sequence, positioning means are provided within the mold cavity to positively locate the teeth of toothed sprocket 52 with respect to the teeth of the spur gear 50. Once this location step is completed, heated polymeric plastic material is injected under pressure within the die cavity until the material flows to form spur gear 50. Once the material has cooled sufficiently, the assembly is removed from the injection molding die.

Integral spur gear and toothed sprocket assembly 48 provides a number of significant advantages over the two-piece construction according to prior art designs as shown by FIG. 4. Since spur gear 50 is formed directly onto toothed sprocket 52, accurate relative positioning between the teeth of these two structure is achieved. Additionally, since slots 54 are provided for each of the teeth of spur gear 50, the strength of these individual teeth is increased significantly over the prior art spur gear 44 construction where spur gear 44 is connected to toothed sprocket 18 only by projections near the center of the spur gear. Also, due to the firm engagement between spur gear 50 and modified toothed sprocket 52, these two parts are firmly attached to each other and problems of their becoming separated during assembly or in use are eliminated. Designers of seat belt retractors were limited to selecting materials for conventional spur gears which had superior dimensional stability characteristics. This design limitation was imposed due to the existence of some relative movement between the spur gear and sprocket and more significantly, due to deflection of the unsupported teeth of the spur gear as it is subjected to the broad range of environmental conditions within a motor vehicle interior. Unfortunately, materials selected for this application, such as Nylon, tend to be brittle and therefore subject to mechanical failure. Due to the substantial increase in the strength of the spur gear component and the greater control over relative positioning of components inherent in the design of integral assembly 48 according to this invention, a broader range of materials can be employed to form the spur gear component. The material for spur gear 50 may be chosen for its low cost and formability characteristics rather than primarily for its dimensional stability. For example, "Hytrel" (Trademark of Du Pont Company) polymeric plastic material has been found suitable for use in practicing this invention. This material is unsuitable for use in forming prior art spur gears since it is hydroscopic and tends to change dimensionally with humidity changes. Finally, by providing integral spur gear and toothed sprocket assembly 48 according to this invention, manufacturing costs and steps can be reduced since the separate step of assembling the two components is eliminated.

While the above description constitutes the preferred embodiments of the present invention, it will be appreciated that the invention is susceptible to modification, variation and change without departing from the proper scope and fair meaning of the accompanying claims.

What is claimed is:

1. In an emergency locking seat belt retractor which prevents seat belt webbing from being withdrawn when said retractor is subjected to deceleration above a predetermined level, said retractor of the type having an inertia sensitive actuator with an actuator pawl engageable with a spur gear which rotates with a toothed sprocket, said actuator pawl further engageable with a locking bar which cooperates with said toothed sprocket to selectively inhibit withdrawal of said seat belt webbing, the improvement comprising;
   a spur gear and toothed sprocket assembly wherein said toothed sprocket defines a plurality of apertures and wherein a portion of each tooth of said spur gear is disposed in one of said apertures whereby said spur gear is in interlocking engagement with said toothed sprocket.

2. The improvement according to claim 1 wherein the material forming said spur gear further forms a ring on the side of said toothed sprocket opposite the surface from which said spur gear extends, said ring in communication with said openings.

3. The improvement according to claim 1 wherein said spur gear is formed by Hytrel (Trademark of Du Pont Company) material.

4. The improvement according to claim 1 wherein said spur gear is molded directly to said toothed sprocket.

* * * * *